3,271,496
METHOD OF SHAPING POLYELECTROLYTE
POLYMER
Alan S. Michaels, Lexington, Mass., assignor to Amicon
Corporation, Cambridge, Mass.
No Drawing. Filed Jan. 27, 1964, Ser. No. 340,560
9 Claims. (Cl. 264—232)

This invention relates to a plastic solid gel composition containing the water insoluble reaction product of two initially water soluble polyelectrolyte polymers, each having dissociable ionic groups of opposite charge, and to a method of making the same.

One object of the present invention is to provide a composition of the type described having improved properties of thermoplasticity.

Another object is to provide a method of forming or shaping a normally non-plastic ionically cross-linked polyelectrolyte polymer by rendering it temporarily plastic, shaping it, then restoring it to its original non-plastic condition.

Other and further objects will be apparent from the description which follows.

While the interaction of two water soluble synthetic organic linear polyelectrolytes having dissociable ionic groups of opposite charge has previously been described, the products of such reaction, which may be termed ionically cross-linked polyelectrolytes, are solid gel structures which are brittle and weak when dried unless prepared under special conditions. I have now discovered that certain inorganic salts, namely, calcium nitrate, calcium bromide, calcium chloride, and sodium bromide when incorporated along with some water in a normally non-plastic ionically cross-linked polyelectrolyte polymer render it plastic and capable of being readily formed or shaped under heat and pressure.

Among the organic linear polymers which may be interacted to produce the ionically cross-linked gel structures which are useful in the present invention, are those having a sufficiently high molecular weight (preferably at least 50,000) to be solid and capable of film formation and containing a plurality of dissociable ionic groups (anionic or cationic as the case may be) chemically bonded to the polymer chain, preferably at least one such ionic group for every six repeating monomeric units in the chain, or at least one such ionic group for each average chain interval of twelve carbon atoms in polymers containing a chain of carbon atoms in the backbone of the polymer molecule. Such polymers include, as those having anionic groups, sodium polystyrene sulfonate, sodium polyvinyl toluene sulfonate, sodium polyacrylate, sodium salts of the hydrolyzed copolymers of styrene with maleic anhydride, sodium polyvinyl sulfonate, and the corresponding free acids (when sufficiently water-soluble) as well as corresponding salts of other alkali metals. Polymers containing cationic groups include polyvinyl benzyl trimethyl ammonium chloride, polyethyleneimine, polyvinyl pyridine, poly(dimethylaminoethyl methacrylate), quaternized polyethylene imine, quaternized poly(dimethylaminoethyl) methacrylate, polyvinyl methyl pyridinium chloride, and the like. The preferred polymers are those containing sulfonate groups and those containing quaternary ammonium groups. The relative proportions of the two polymers containing oppositely charged ionic groups used in making the ionically cross-linked polyelectrolyte polymers may vary over a substantial range, from 10:1 to 1:10 by weight, preferably from 4:1 to 1:4 by weight.

The amount of the salts present in the composition may vary over a wide range from about 10% to 150% or more based on the weight of the polyelectrolyte polymer gel. Best results for most purposes are obtained when the salt is present in an amount from 40% to 60% by weight of the polyelectrolyte polymer. The amount of water present with the salt in the composition may also vary over a wide range, from about 20% of the total weight of salt and polymer to 100% or more. Best results are usually obtained when the water amounts to 30% to 75% by weight of the total salt and polymer.

A variety of methods may be employed for introducing the salt and water into the ionically cross-linked polyelectrolyte polymer. Preferably the polymer, whether in the form of a shaped solid article or in the form of a finely divided solid, is immersed in an aqueous solution of the desired salt, then dried at least in part by evaporation of the water. The resultant solid exhibits plastic flow at temperatures from room temperature up to 300° C. or even higher, up to the decomposition temperature, when subjected to pressures of the order of 100 to 5,000 pounds per square inch, preferably 1,000 to 4,000 pounds per square inch. In contrast the polymer before impregnation with the salt and water exhibits no substantial plastic flow at such temperatures and pressures but remains non-plastic.

The ionically cross-linked polyelectrolyte polymer employed in the present invention may be in the form of a single integral mass of material or it may be in the form of loose granules or particles which are compacted and bonded together by the heat and pressure during the shaping step.

Once the mass of polymer has attained the desired shape, the salt used to render it plastic may be removed by leaching with any suitable solvent, usually and preferably water, whereupon the shaped mass regains its initial non-plastic characteristics.

The following specific examples will illustrate more fully the nature of the present invention but are not intended to be a limitation upon its scope.

*Example 1*

A purified ionically cross-linked polyelectrolyte polymer was prepared by reacting two synthetic organic polymers, one containing dissociable anionic groups and the other containing dissociable cationic groups, in an aqueous medium containing a shielding electrolyte, and subsequently precipitating the cross-linked polymer from solution by dilution with water. In carrying out this procedure approximately 100 parts by weight of dry powdered sodium polystyrene sulfonate was added together with 333 parts of an aqueous solution containing 30% by weight of polyvinyl benzyzl trimethyl ammonium chloride, to a solution consisting of 266 parts by weight of calcium nitrate tetrahydrate, 266 parts of 1,4-dioxane, and 33 parts of water. The resulting viscous syrup, which was homogeneous and almost perfectly transparent, was mixed gradually with 20,000 parts by weight of cold tap water in a high-speed mixer. The slurry which resulted was vacuum filtered, and the filter cake was then washed with ten to twenty times its weight of tap water. After drying at about 100° C. the hard and brittle filter cake was ground in a ball mill to produce a powder passing a 40 mesh sieve.

There were mixed together 100 parts by weight of the dry powdered ionically cross-linked polymer gel prepared as described above and 400 parts of an aqueous solution containing 15% by weight of calcium bromide. After stirring to produce a smooth paste, the mixture was placed in a shallow container and heated for approximately thirty minutes in an air oven at 120° to 130° C. When cooled to room temperature the mixture was found to have become consolidated into a yellowish-brown transparent tough rubbery solid gel containing 50% residual water which could readily be cut into pieces of any desired size.

A piece of the material was press-molded by confining it between two sheets of Mylar polyester film, then placed between the heated platens of a hydraulic press and subjected to a pressure of 2000–4000 p.s.i. at a temperature of about 210° C. for twelve minutes. Upon removal from the press and separation from the sheets of polyester film, the material was in the form of a thin flat sheet. It was immersed in running water and allowed to remain overnight in order to leach out the calcium bromide. After washing, the sheet produced was found to be tough, transparent, uniform in thickness, and free from imperfections. When dried at elevated temperature to remove as much water as possible, the product became hard and brittle.

The thermoplastic nature of the composition described above makes it possible to subject the composition to other well-known heat-shaping procedures such as injection molding, melt casting, melt spinning, vacuum forming, film laminating, and the like.

Similar results were obtained by substituting other ionically cross-linked polyelectrolyte polymers for the specific one employed in the foregoing example and by substituting other salts such as calcium nitrate, calcium chloride, or sodium bromide for the calcium bromide used in the example. Cross-linked polyelectrolyte polymers made by reacting one part by weight of sodium polystyrene sulfonate with two parts of polyvinyl benzyl trimethyl ammonium chloride or by reacting two parts by weight of the former with one of the latter, when treated as described above, gave similar results. Objects having other shapes could readily be produced by employing an appropriate mold during the press-molding operation.

*Example 2*

A piece of the ionically cross-linked polyelectrolyte polymer rendered theromplastic by the procedure of Example 1 was placed on the surface of a sheet of filter paper, and the two were then confined between layers of Mylar polyester film, and the assembly was press-molded at 500 p.s.i. between the platens of a hydraulic press heated 170° F. for twenty-five minutes. The finished product consisted of the paper sheet thoroughly impregnated with polyelectrolyte polymer. The product was washed with water to leach out the salt and there was obtained a tough resilient non-porous fiber-reinforced composite.

Although specific embodiments of the invention have been herein described it is not intended to limit the invention solely thereto, but to include all of the obvious variations and modifications within the spirit and scope of the appended claims.

What is claimed is:

1. The method of shaping a solid non-plastic gel composition formed of two ionically cross-linked synethetic organic linear polymers, one of said polymers containing dissociable anionic groups and the other containing dissociable cationic groups, said ionic cross-linkages being the sole cross-linkages present, which method comprises imbibing into said composition from aqueous solution a salt selected from the class consisting of calcium nitrate, calcium bromide, calcium chloride, sodium bromide, and mixtures thereof, evaporating a portion of the solvent to leave a solid plastic composition, and shaping said composition under pressure at elevated temperature.

2. The method as claimed in claim 1 in which said anionic groups are sulfonate and said cationic groups are quaternary ammonium groups.

3. The method as claimed in claim 1 in which said one polymer comprises sodium polystyrene sulfonate and said other polymer comprises polyvinyl benzyltrimethyl ammonium chloride.

4. The method as claimed in claim 1 comprising the additional step of leaching the salt from the shaped composition.

5. The method of shaping a solid non-plastic gel composition formed of two ionically cross-linked synthetic organic linear polymers, one of said polymers containing dissociable anionic groups and the other containing dissociable cationic groups, said ionic cross-linkages being the sole cross-linkages present, which method comprises immersing said solid gel composition in an aqueous salt solution containing a salt selected from the class consisting of calcium nitrate, calcium bromide, calcium chloride, sodium bromide, and mixtures thereof, evaporating a portion of the solvent to leave a solid plastic composition in which the amount of salt is from 10% to 150% by weight of the gel composition and shaping said plastic composition under pressure at elevated temperature to form a unitary solid mass.

6. The method of shaping a solid non-plastic gel composition formed of two ionically cross-linked synthetic organic linear polymers, one of said polymers containing dissociable anionic groups and the other containing dissociable cationic groups, said ionic cross-linkages being the sole cross-linkages present, which method comprises mixing said composition in finely divided form with an aqueous solution containing a salt of the class consisting of calcium nitrate, calcium bromide, calcium chloride, sodium bromide, and mixtures thereof, evaporating a portion of the solvent to leave a solid plastic composition, and shaping said composition under pressure at elevated temperature to form a unitary solid mass.

7. The method as claimed in claim 6 comprising the additional step of leaching the salt from the shaped composition.

8. The method as claimed in claim 5 in which said anionic groups are sulfonate and said cationic groups are quaternary ammonium.

9. The method as claimed in claim 8 comprising the additional step of leaching the salt from the shaped composition.

References Cited by the Examiner

UNITED STATES PATENTS 2,832,746    4/1958    Jackson _____ 260—29.6
2,832,747    4/1958    Jackson _____ 260—874

ALEXANDER H. BRODMERKEL, *Primary Examiner.*

F. S. WHISENHUNT, *Assistant Examiner.*